F. MARIN.
Railroad Cars.
No. 143,363. Patented September 30, 1873.
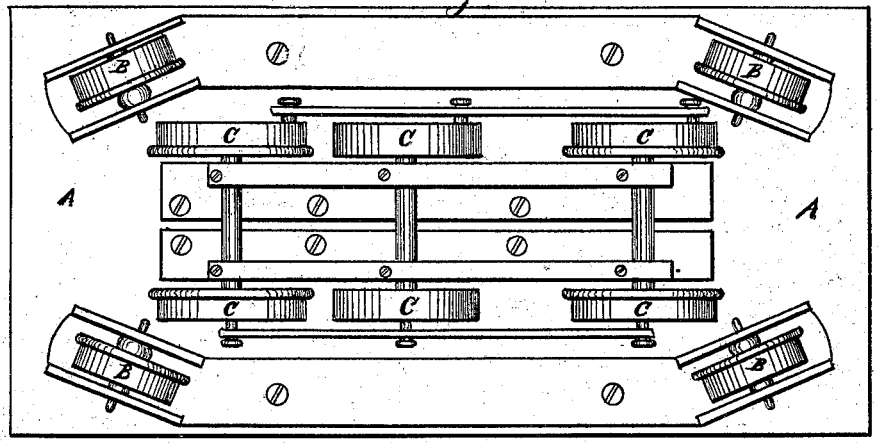
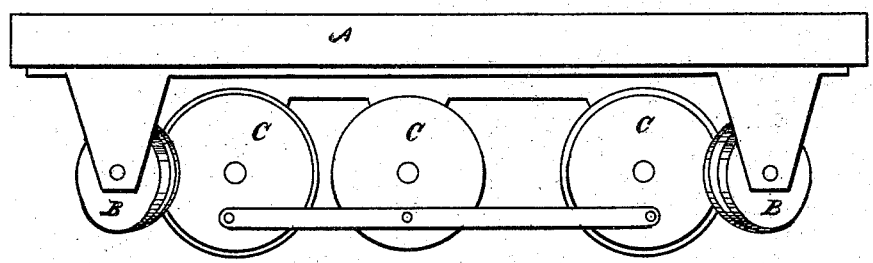
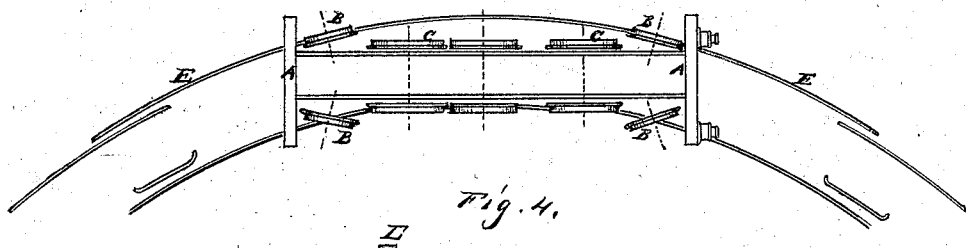
Witnesses
François Marin
per A.H. & R.K. Evans
attys.

UNITED STATES PATENT OFFICE.

FRANÇOIS MARIN, OF GENEVA, SWITZERLAND.

IMPROVEMENT IN RAILROAD-CARS.

Specification forming part of Letters Patent No. 143,363, dated September 30, 1873; application filed July 1, 1873.

*To all whom it may concern:*

Be it known that I, FRANÇOIS MARIN, of Geneva, Republic of Switzerland, have invented Improvements in the Construction of Railroad-Cars and Locomotives and the Tracks of Railway-Curves; and I do hereby declare the following description and accompanying drawings are sufficient to enable any person skilled in the art or science to which it most nearly appertains to make and use my said invention or improvement without further invention or experiment.

My invention relates to a novel arrangement by which railroad locomotives and carriages can be run upon curves of different radiuses without creating the extreme wear and friction to which rolling-stock, as ordinarily constructed, is subjected when moving upon the present railway-curve. My invention consists in providing each carriage and locomotive with an extra set of wheels, one of which is placed at or near each corner of the car or locomotive frame. These wheels are provided with flanges in the ordinary way, and are smaller than the ordinary truck or driving wheels, so that the bearing-point of their tires will be somewhat above the bearing-point of the tires of the ordinary wheels.

These wheels can either be set at a fixed angle or they can be connected with suitable mechanism, so that they can be shifted to any desired angle to accommodate the radius of the curve to be passed.

In connection with these supernumerary wheels, I provide an elevated track on the outside of the curve, so as to form a somewhat wider gage than the ordinary track, upon which the two wheels on the outer side of the car or locomotive will take and travel, while the ordinary car or driving wheels upon the opposite side of the car move upon the ordinary track, thus permitting the wheels which move upon the two tracks of the curve to have a movement independent of each other.

In order to more fully illustrate and explain my invention, reference is had to the accompanying drawings forming a part of this specification, in which—

A represents an ordinary railroad locomotive or carriage, which is provided with the usual driving or carrying wheels C C. At or near each corner of the frame of this car or locomotive, I secure to its under side a wheel, B, the plane of whose bearing-point is somewhat above the plane of the bearing-point of the driving or ordinary wheels. When the car or locomotive is moving upon a straight track it is carried upon the ordinary wheels in the ordinary manner, the corner wheels B B being inoperative. At each curve of the track I construct an elevated rail, E, on the outer radius of the curve. This track is placed far enough outside of the gage of the usual track to permit the wheels B of the car or locomotive to take upon it as the car moves around the curve, thus freeing the outside wheel C from its track, and leaving only the supernumerary wheel B on the outside of the car and the inside wheels C for the car to move upon. The wheels C are secured at an angle to the ordinary wheels, and perform the office of what are called "cramped" wheels for running curves.

If desired, these wheels can be adjustable by means of a suitable mechanism operated from the engine of the train, by which the angle of all the supernumerary wheels on the outside of the train can be shifted simultaneously to the desired angle to accommodate the radius of each curve as it is approached. Both sides of each car and locomotive are provided with these supernumerary wheels, and the outside wheels only operate on a curve, and, as a consequence, the bearing-rails for these wheels are only required on the outside radius of the curve.

By this arrangement a train of cars will pass around a curve with much less friction, and consequently less wear and tear of rolling-stock, than where the present plan is used. The angularly-placed wheels run independent of the usual bearing-wheels, thus permitting the bearing-wheels to act simply as a single wheel.

Having thus described my invention, what I claim, and desire to secure by Letters Patent, is—

The supernumerary wheels B, set at an angle, and applied to a locomotive or railway-carriage, A, in combination with the elevated outside rail E of the curve of a railway-track, as and for the purpose specified.

In witness whereof I hereunto set my hand and seal.

FRANÇOIS MARIN. [L. S.]

Witnesses:
  CHARLES EDWARD LUTTIN,
  THEOPHILE KELLER.